A. L. EDMISON & J. RIKKELMAN.
COMBINED MOTION PICTURE AND SOUND REPRODUCING DEVICE.
APPLICATION FILED NOV. 24, 1917.
1,301,045.
Patented Apr. 15, 1919.
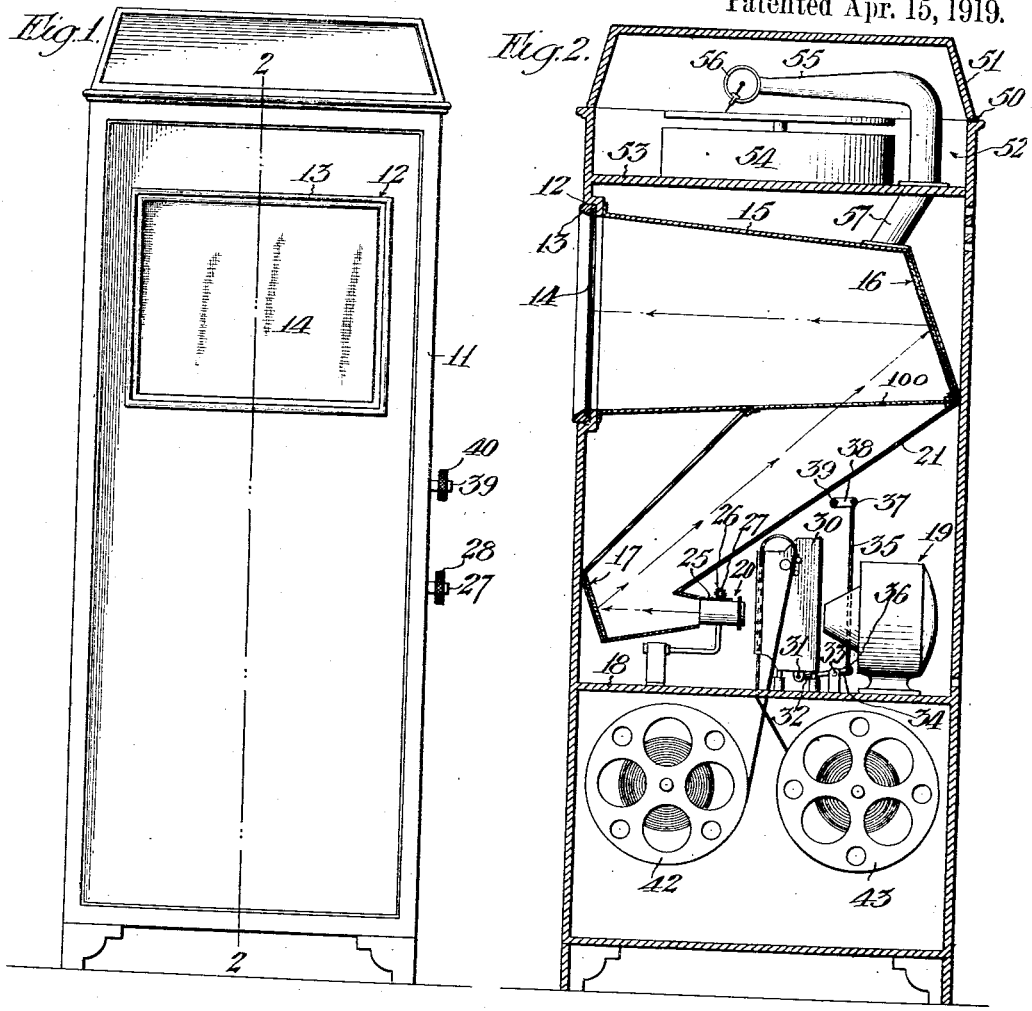
Inventors
Albert L. Edmison
John Rikkelman
by Graham & Kiuic
Attorneys

UNITED STATES PATENT OFFICE.

ALBERT L. EDMISON AND JOHN RIKKELMAN, OF LOS ANGELES, CALIFORNIA.

COMBINED MOTION-PICTURE AND SOUND-REPRODUCING DEVICE.

1,301,045.  Specification of Letters Patent.  Patented Apr. 15, 1919.

Application filed November 24, 1917. Serial No. 204,128.

*To all whom it may concern:*

Be it known that we, ALBERT L. EDMISON and JOHN RIKKELMAN, the former being a citizen of the United States, and the latter being a subject of the Queen of Holland, both residing at Los Angeles, in the county of Los Angeles and State of California, have invented a new and useful Combined Motion-Picture and Sound-Reproducing Device, of which the following is a specification.

Our invention relates to the art of providing entertainment in homes, schools, clubs, or other places.

The principal object of the invention is to provide an entertainer which will simultaneously engage the senses of sight and hearing, and which will be constructed in a compact and artistic manner.

Further objects and advantages will be made evident hereinafter.

Referring to the drawings, which are for illustrative purposes only:

Figure 1 is a front view of a cabinet embodying our invention.

Fig. 2 is a cross section, partly in elevation, on a plane represented by the line 2—2 of Fig. 1.

In the form of our invention illustrated in the drawings, a cabinet 11 is provided, this cabinet having a square opening 12 in the front thereof in which is secured a frame 13. Tightly secured in the frame 12 is a diaphragm 14 formed of tracing cloth. This diaphragm, while not entirely opaque, is nevertheless translucent, and is sufficiently flexible to allow sound waves to readily pass therethrough. Secured inside the cabinet 11, behind the diaphragm 14, is a horn 15, this horn being preferably formed of light wood and having an upper mirror 16 secured in the extreme rear thereof. Located near the front of the cabinet, below the diaphragm 14, is a lower mirror 17, and located on a shelf 18 below the lower mirror 17 is a motion picture projector 19. The motion picture projector is so placed that an image produced thereby is projected through a lens system 20 onto the lower mirror 17, passing up through a light chute 21 to the upper mirror 16, and being reflected therefrom on the rear of the diaphragm 14. The projector 19 is so arranged that the image focused on the screen 14 is reversed with regard to the vertical axis, so that when the image is seen through the screen it will appear in its proper position.

The lens system 20 is provided with a rack 25 engaged by a pinion 26 carried on a shaft 27 which sticks through the side of the cabinet and is provided with a focusing handle 28. The forward portion of the projector 19 is mounted to slide vertically, and is pivoted at 31 to a framing lever 32, this lever being carried on a fixed pivot 33 and having a projection 34 to which a rod 35 is pivoted, as shown at 36. The rod 35 extends up and is pivoted at 37 on a lever 38 carried on a fixed shaft 39, the shaft 39 projecting through the side of the cabinet and being provided with a framing handle 40. Reels of motion picture 42 and 43 are located below the shelf 18. Hinged at 50 on the top of the cabinet is a cover 51 which gives access to a phonograph compartment, this phonograph compartment being closed at the bottom, as shown at 53, and consisting of a standard phonograph 54 having a swinging tone arm 55 and a reproducer 56. The tone arm 55 is connected by means of a sound channel 57 with the top of the horn 15. The side of the cabinet is open to give access to the interior thereof.

The method of operation is as follows:

A motion picture record may be placed on the phonograph and played in the usual manner, the sound passing through the sound channel 57 into the horn 15. The nature of the tracing cloth diaphragm is such that it offers little or no resistance to the sound, tending however to muffle out scratches and other impure tones, thereby softening and enhancing the quality of the music reproduced. At the same time that the phonograph is playing, the projector 19 is throwing a motion picture on the diaphragm 14 where it can be readily viewed. By mounting the motion picture projector and the phonograph in a single cabinet of small size we produce an instrument which can be readily installed in the home and which has a special utility in schools or other places. The music or sound reproduced is preferably arranged to bear a proper relationship to the picture projected, so that the senses of sight and hearing are simultaneously engaged.

For the purpose of preventing the noise of the motion picture machine from being heard through the horn 15 and for the purpose of improving the acoustic properties thereof, we provide a sound opaque but light translucent diaphragm 100. This diaphragm is preferably of plate glass and is located as shown in Fig. 2 completely closing the opening in the bottom of the horn 15 through which the light is projected on the mirror 16 to any sound and at the same time not obstructing the light. We attach great importance to this feature.

We claim as our invention:—

1. In an entertainer; a horn; a phonograph located above said horn; means for connecting the interior of said horn with the tone arm of said phonograph; a translucent flexible diaphragm closing the front of said horn; a motion picture projector located below said horn; a lower mirror on which the light from said projector impinges; and an upper mirror located in the back of said horn and so placed as to receive the light reflected from said lower mirror and project same on said diaphragm.

2. In an entertainer; a horn; a phonograph located above said horn; means for connecting the interior of said horn with the tone arm of said phonograph; a sheet of translucent tracing linen forming a diaphragm secured in the front of said horn; a motion picture projector located below said horn; a lower mirror on which the light from said projector impinges; and an upper mirror located in the back of said horn and so placed as to receive the light reflected from said lower mirror and project same on said diaphragm.

In testimony whereof, we have hereunto set our hands at Los Angeles, California, this 16th day of November, 1917.

ALBERT L. EDMISON.
JOHN RIKKELMAN.